United States Patent Office 3,018,289
Patented Jan. 23, 1962

3,018,289
PROCESS FOR PREPARING OXAMIDINES
John D. Behun, Southgate, Mich., assignor to Wyandotte Chemicals Corporation, Wyandotte, Mich., a corporation of Michigan
No Drawing. Filed Feb. 10, 1960, Ser. No. 7,769
14 Claims. (Cl. 260—296)

This invention relates, in one aspect, to a process for preparing oxamidines by interacting a di-lower alkyl oxalimidate of the formula:

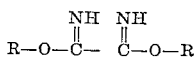

wherein R is an aliphatic hydrocarbon radical having from 1 to 5 carbon atoms with a primary amine. In a second aspect, this invention relates to a process for preparing oxamidines wherein the reaction is carried out in the presence of activating alcohols and catalysts which permits the oxamidines to be prepared not only in substantially high yield but also in an exceptionally high degree of purity.

Oxamidines are useful as metal deactivators in gasolines and other petroleum distillates wherein they deactivate the catalytic effect which copper and other metal compounds have on the oxidative deterioration of motor fuels when such fuels come in contact with air. See U.S. Patent No. 2,747,980—W. R. T. Gleim (May 29 1956). In addition to their sequestering and chelating properties the oxamidines are useful as insecticides in the agricultural industry. Also, these compounds are useful as intermediates in the preparation of pharmaceuticals, dyestuffs and polymeric materials.

Oxamidines, such as dibenzyloxaldiamidine, may be prepared in accordance with the method set forth in Example I of U.S. Patent No. 2,747,980 by passing dry cyanogen slowly into a solution of benzylamine in absolute alcohol at 0°–4° C., allowing the reaction mixture to stand at room temperature for about 20 hours, and filtering the resultant crystals from the mixture. In this method, cyanogen, a gaseous, hazardous-to-handle, highly toxic chemical, is employed as one of the reactants.

An object of this invention, therefore, is to provide a process for preparing oxamidines in which relatively safe, easy-to-handle chemicals are employed as reactants.

Another object of this invention is to provide a process for preparing oxamidines in which the reactants, primary amines and di-lower alkyl oxalimidates, are relatively nontoxic, safe chemicals.

A further object of this invention is to provide a process for preparing oxamidines in high yields and in a high degree of purity by interacting the principal reactants in the presence of activating alcohols and catalysts.

In accordance with this invention, there is provided a process for preparing oxamidines which comprises interacting about 1 mol of a di-lower alkyl oxalimidate of the formula:

wherein R is an aliphatic hydrocarbon radical having from 1 to 5 carbon atoms with about 2 mols of a primary amine according to the formula:

wherein R' is a radical selected from the group consisting of phenyl, alkyl-substituted phenyl, phenyl-substituted alkyl and aromatic heterocyclic radicals in which the hetero atom is nitrogen, in the presence of an activating alcohol and an acid catalyst at a temperature from about 15° C. to about the reflux temperature of the mixture and at about atmospheric pressure.

The primary amines which may be employed in the method of the invention include phenylamine, alkyl-substituted phenylamines, phenyl alkylamines and aromatic heterocyclic amines in which the hetero atom is nitrogen. The alkyl-substituted phenylamines which are useful in the method of the invention have from 1 to about 12 carbon atoms in the alkyl portion of the molecule and include the mono-, di- and trialkyl-substituted phenylamines such as methylphenylamine, dimethylphenylamine, trimethylphenylamine, ethylphenylamine, monoisopropylphenylamine, triisopropylphenylamine, ditertiarybutylphenylamine and tritertiarybutylphenylamine. The phenyl-substituted alkylamines which are useful in the method of the invention have from 1 to about 3 carbon atoms in the alkyl portion of the molecule and include, for example, phenylmethylamine, phenylethylamine and phenylpropylamine. The aromatic heterocyclic amines which can be used as reactants in the process described herein include those amines wherein the heterocyclic ring has, preferably, 5 or 6 members in which the hetero atom is nitrogen. Thus, the aromatic nitrogen-containing heterocyclic radicals in these amines are 5 or 6 membered rings consisting of carbon, nitrogen and hydrogen and having from 1 to 4 nitrogen atoms in the ring. Examples of aromatic heterocyclic amines include pyrrolylamine, pyridylamine, pyridazylamine, pyrimidylamine and pyrazylamine.

The di-lower alkyl oxalimidates which may be employed in the method of the invention include dimethyl oxalimidate, diethyl oxalimidate, dipropyl oxalimidate, dibutyl oxalimidate and diphenyl oxalimidate.

Diethyl oxalimidate, for example, which is reacted with one of the aforementioned primary amines in accordance with the method of the invention, may be prepared by adding sodium cyanide to an aqueous ethanol solution, cooling the solution and passing chlorine therethrough until the reaction is completed.

The reactants, a di-lower alkyl oxalimidate and a primary amine, are, in general, brought into contact in about stoichiometric proportions. Although an excess amount of the primary amine can be used wherein the upper limit is dictated primarily by economic considerations, it is preferred to employ, however, about 2 mols of the primary amine for each mol of di-lower alkyl oxalimidate.

In order to obtain the oxamidines in substantially high yields and in a high degree of purity, the reaction between the di-lower alkyl oxalimidate and the primary amine is carried out in the presence of activating alcohols and acid catalysts.

Although oxamidines, for example, N,N'-diphenyl-oxamidine, can be prepared by refluxing a mixture of diethyl oxalimidate and aniline, nevertheless, the product obtained therefrom is a dark crystalline solid which is undesirable for certain commercial applications, in the absence of extensive purification.

I have now discovered that, if the reaction between diethyl oxalimidate and a primary amine is carried out in the presence of activating alcohols, highly desirable colorless, crystalline products are obtained in good yields and that such yields can, in general, be substantially improved by employing an acid catalyst in conjunction with the activating alcohol. The acid catalysts, in addition to improving the yields, reduce, in general, the reaction time necessary to obtain the desired oxamidines.

The activating alcohols which are employed in the method of the invention in order to obtain colorless, crystalline oxamidines include members selected from the group consisting of lower aliphatic alcohols and lower monoalkyl glycol ethers. Examples of lower aliphatic alcohols are those alcohols having from about 1 to 8 carbon atoms such as methyl alcohol, ethyl alcohol, isopropyl alcohol, butyl alcohol, pentyl alcohol, hexyl alcohol, heptyl alcohol and isooctyl alcohol. The lower monoalkyl glycol ethers which may be used in the process described herein include, for example, methyl, ethyl, propyl or butyl ethers of (A) ethylene glycol, diethylene glycol and triethylene glycol; (B) propylene glycol, dipropylene glycol and tripropylene glycol, and (C) butylene glycol, dibutylene glycol and tributylene glycol. Specific examples of the glycol ethers are monomethyl ether of ethylene glycol, monoethyl ether of dipropylene glycol and monopropyl ether of butylene glycol. The activating alcohols are employed in a concentration of at least about 0.05 liter per mol of diethyl oxalimidate. Although the upper concentration limit is dictated primarily by economic conditions, a practical upper concentration for the activating alcohol is about 2 liters of solvent per mol of di-lower alkyl oxalimidate. I have found, however, that increasing the concentration of solvent has a depressing effect on the yield of oxamidine and it is, therefore, desirable to use that quantity of solvent from which optimum yields are obtained. The term "activating alcohol" as used herein does not preclude the presence of small amounts of water, up to about 10 weight percent, and other impurities usually found in commercially available solvents. Mixtures of the aforementioned alcohols may also be advantageously employed in the method of the invention.

The acid catalysts which are effectively employed in the method of the invention include the mineral acids such as hydrochloric acid, sulfuric acid and phosphoric acid; and Lewis acids such as aluminum chloride, ferric chloride, stannic chloride and boron trifluoride and mixtures thereof. The acid catalysts are employed at a concentration from about 0.0001 mol of catalyst per mol of di-lower alkyl oxalimidate to about 0.01 mol of catalyst per mol of di-lower alkyl oxalimidate. The acid catalysts are particularly important in the method of the invention because the presence of the catalyst in the reaction permits high yields to be obtained in significantly short periods of time and at reduced temperatures, as will be evident from certain of the examples hereinafter set forth.

Although a wide range of temperatures can be employed, the reaction is, in general, carried out at a temperature about 15° C. up to about the reflux temperature of the reaction mixture and at subatmospheric, atmospheric or superatmospheric pressures. Good yields are obtained when the reaction is carried out at about room temperature. However, the reaction is preferably carried out at about the reflux temperature of the reaction mixture and at about atmospheric pressure.

The oxamidines which are prepared in accordance with the method of the invention conform to the following formula:

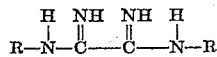

wherein R is a radical selected from the group consisting of phenyl, alkyl-substituted phenyl in which the alkyl portion has from 1 to about 12 carbon atoms, phenyl-substituted alkyl in which the alkyl portion has from 1 to about 3 carbon atoms and 5 and 6 membered aromatic heterocyclic radicals in which the hetero atom is nitrogen.

Oxamidines which can be prepared by the method of the invention include, for example, N,N'-diphenyloxamidine, N,N'-di[dimethylphenyl]oxamidine, N,N'-diethylphenyloxamidine, N,N'-di[diisopropylphenyl]oxamidine, N,N'-dibenzyloxamidine, N,N'-dipyrrolyloxamidine, N,N'-dipyridyloxamidine, N,N'-dipyridazyloxamidine, N,N'-dipyrimidyloxamidine and N,N'-dipyrazyloxamidine.

The following examples further illustrate the method of the invention. In certain of the examples diethyl oxalimidate is abbreviated as DEOI.

*Example I*

In this example, diethyl oxalimidate and aniline are reacted at elevated temperatures in the absence of an activating alcohol and an acid catalyst.

5.0 grams of diethyl oxalimidate and 9.7 grams of aniline were mixed in an Erlenmeyer flask and heated on a steam bath for 2 hours. After eight minutes of heating, it was observed that the color of the mixture became coal black. At the end of the two-hour period, a dark crystalline solid which had formed was slurried with ethanol and filtered from the mixture. There was obtained 6.6 grams of N,N'-diphenyloxamidine having a melting point in the range of 211°–213° C. However, in view of the dark color of this crystalline product, it is, in general, unsuitable for further commercial application, in the absence of extensive purification.

*Example II*

In this example, diethyl oxalimidate and aniline are reacted at reflux temperatures in the presence of an activating solvent.

5.0 grams of DEOI and 9.7 grams of aniline were added to 10 ml. of ethanol under agitation and the resulting mixture was refluxed. After 25 minutes of refluxing, copious quantities of colorless crystals appeared in the mixture. The mixture was subsequently cooled and a colorless crystalline product was filtered therefrom which was washed with ethanol. There was obtained 7.7 grams of N,N'-diphenyloxamidine having a melting point in the range of 214°–216° C.; thus, the yield was 93%. This example illustrates, therefore, that colorless, highly desirable, crystalline oxamidines are obtained by reacting DEOI and a primary amine in the presence of an activating alcohol.

*Example III*

This example illustrates that the concentration of the activating alcohol has an effect upon the yield.

A. 5.0 grams of DEOI and 9.7 grams of aniline were dissolved in 100 ml. of ethanol and the mixture was refluxed for 6 hours. Upon cooling, a crystalline product precipitated from the reaction mixture. The crystalline material was filtered from the mixture and washed with ethanol. There was obtained 2.9 grams of N,N'-diphenyloxamidine representing a 35% yield.

B. A mixture of 5.0 grams of DEOI, 9.7 grams of aniline and 25 ml. of ethanol was refluxed over a heating mantle. After refluxing for 2 hours, crystals precipitated from the reaction mixture. The mixture was cooled and the crystalline product was filtered therefrom and washed with ethanol. There was obtained 6.4 grams of N,N'-diphenyloxamidine representing a 77.3% yield.

C. After 25 minutes of refluxing a mixture of 5.0 grams of DEOI, 9.7 grams of aniline and 10 ml. of ethanol, a crystalline product precipitated from the reaction mixture. This product was filtered and washed with ethanol. There was obtained 7.7 grams of N,N'-diphenyloxamidine representing a 93.0% yield.

It will be noted, therefore, that increasing the concentration of the activating alcohol has a depressing effect on the yield and that optimum yields are obtained when the concentration of the solvent approaches the low end of the concentration for this material, i.e. the low end of the concentration range of 0.05 to 2.0 liters of alcohol per mol of DEOI.

*Example IV*

This example illustrates that methanol and the methyl ether of ethylene glycol are effective activating solvents in the method of the invention.

A. A mixture of 7.2 grams (0.05 mol) of DEOI, 9.3 grams (0.1 mol) of aniline and 10 ml. of methanol was refluxed for about 2 hours. Upon cooling, a crystalline product precipitated out which was filtered from the reaction mixture. There was obtained 6.1 grams of N,N'-diphenyloxamidine representing a 51.2% yield.

B. A mixture of 7.2 grams of DEOI, 9.3 grams of aniline and 10 ml. of the methyl ether of ethylene glycol was refluxed for about 2 hours. Upon cooling, a crystalline product precipitated out and was filtered from the mixture. There was obtained 7.1 grams of N,N'-diphenyloxamidine representing a 60% yield.

*Example V*

This example illustrates how an acid catalyst, sulfuric acid, affects the time required for completion of the reaction between DEOI and aniline.

A. 7.2 grams of DEOI and 9.3 grams of aniline were added to and mixed with 25 ml. of ethanol. The mixture was maintained at room temperature for 4 hours. At the end of this time, there was no evidence of any crystalline product separating from the reaction mixture.

B. To a mixture of 7.2 grams of DEOI, 9.3 grams of aniline and 25 ml. of ethanol, maintained at room temperature, there were added three drops of sulfuric acid dissolved in 2 ml. of water. A white crystalline product immediately precipitated from the reaction mixture. At the end of 4 hours, the mixture was almost completely solidified. The crystalline product was filtered from the reaction mixture and there was obtained 7.0 grams of N,N'-diphenyloxamidine representing a 59% yield.

It will be noted that the reaction between DEOI and aniline readily takes place at room temperature in the presence of an acid catalyst.

*Example VI*

This example illustrates how an acid catalyst, aluminum chloride, affects the yield in the reaction between DEOI and aniline under reflux conditions.

A. A mixture of 7.2 grams of DEOI, 9.3 grams of aniline and 10 ml. of methanol, was refluxed for ½ hour. Upon cooling and standing, a white crystalline product separated out and it was filtered from the reaction mixture. There was obtained 2.8 grams of N,N'-diphenyloxamidine representing a 23.5% yield.

B. A small amount, less than 0.1 gram, of aluminum chloride was added to a mixture of 7.2 grams of DEOI and 9.3 grams of aniline and 10 ml. of ethanol and the mixture was refluxed for ½ hour. The reaction mixture was cooled and a crystalline solid which separated out was filtered therefrom. There was obtained 8.0 grams of N,N'-diphenyloxamidine representing a 67% yield.

*Example VII*

This example illustrates how an acid catalyst, ferric chloride, affects the yield in the reaction between DEOI and aniline under reflux conditions.

A. A mixture of 7.2 grams of DEOI, 9.3 grams of aniline and 25 ml. of ethanol was refluxed for ½ hour. Upon cooling, a crystalline solid separated out and it was filtered from the reaction mixture. There was obtained 0.5 gram of N,N'-diphenyloxamidine representing a yield of 4.2%.

B. A few crystals of ferric chloride were added to a mixture of 7.2 grams of DEOI, 9.3 grams of aniline and 25 ml. of ethanol and the mixture was refluxed for ½ hour. Upon cooling, a crystalline product separated out and it was filtered and washed with ethanol. There was obtained 6.4 grams of N,N'-diphenyloxamidine representing a 53.5% yield.

*Example VIII*

This example illustrates how an acid catalyst, sulfuric acid, affects the reaction between DEOI and benzylamine at room temperature.

A. A mixture of 2.6 grams (0.025 mol) of benzylamine, 1.8 grams (0.0125 mol) of DEOI and 25 ml. of ethanol was maintained at room temperature for 3¾ hours. A crystalline product separated out and was filtered from the reaction mixture. There was obtained 1.3 grams of N,N'-dibenzyloxamidine representing a 39% yield.

B. One drop of concentrated sulfuric acid was added to a mixture of 2.6 grams of benzylamine, 1.8 grams of DEOI and 25 ml. of ethanol and the mixture was maintained at room temperature under a nitrogen atmosphere for 3¾ hours. There was obtained from this reaction mixture 2.5 grams of N,N'-dibenzyloxamidine representing a 75% yield.

*Example IX*

This example illustrates how an acid catalyst, aluminum chloride, affects the yield in the reaction between 2-pyridylamine and DEOI under reflux conditions.

A. A mixture of 4.7 grams of 2-pyridylamine, 3.6 grams of DEOI and 25 ml. of ethanol was refluxed for 1 hour. Upon cooling and standing, no crystalline solid separated from the reaction mixture.

B. About 0.1 gram of aluminum chloride was added to a mixture of 4.7 grams of 2-pyridylamine, 3.6 grams of DEOI and 25 ml. of ethanol and the mixture was refluxed for 1 hour. Upon cooling and standing, a crystalline product separated out from the reaction mixture. The crystalline material was filtered from the mixture and there was obtained 2.2 grams of N,N'-di[2-pyridyl]-oxamidine representing a 37% yield.

Thus, the objects of this invention have been accomplished, namely a process has been provided for preparing oxamidines in high yield and in a high degree of purity which comprises interacting a di-lower alkyl oxalimidate and one of the aforementioned primary amines in the presence of an activating alcohol and an acid catalyst under the condition of temperature and pressure as previously described.

I claim:

1. A process for preparing oxamidines which comprises interacting about 1 mol of a di-lower alkyl oxalimidate according to the formula:

wherein R is an aliphatic hydrocarbon radical having from 1 to 5 carbon atoms with about 2 mols of a primary amine of the formula:

$$R'NH_2$$

wherein R' is a radical selected from the group consisting of phenyl, alkyl-substituted phenyl in which the alkyl portion has from 1 to about 12 carbon atoms, phenyl-substituted alkyl in which the alkyl portion has from 1 to about 3 carbon atoms and aromatic heterocyclics having 5 and 6 atoms in which the hetero atom is nitrogen, in the presence of an activating alcohol and an acid catalyst selected from the group consisting of mineral acids and electron acceptor salts at a temperature from about 15° C. to about the reflux temperature of the mixture.

2. A process in accordance with claim 1 wherein said primary amine is phenylamine and the di-lower alkyl oxalimidate is diethyl oxalimidate.

3. A process in accordance with claim 1 wherein said primary amine is phenylmethylamine and the di-lower alkyl oxalimidate is diethyl oxalimidate.

4. A process in accordance with claim 1 wherein said primary amine is dimethylphenylamine and the di-lower alkyl oxalimidate is diethyl oxalimidate.

5. A process in accordance with claim 1 wherein said primary amine is pyridylamine and the di-lower alkyl oxalimidate is diethyl oxalimidate.

6. A process for preparing oxamidines which comprises interacting about 1 mol of a di-lower alkyl oxalimidate according to the formula:

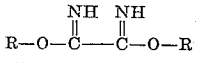

wherein R is an aliphatic hydrocarbon radical having from 1 to 5 carbon atoms with about 2 mols of a primary amine of the formula:

$$R'NH_2$$

wherein R′ is a radical selected from the group consisting of phenyl, alkyl-substituted phenyl in which the alkyl portion has from 1 to about 12 carbon atoms, phenyl-substituted alkyl in which the alkyl portion has from 1 to about 3 carbon atoms, and aromatic heterocyclics having 5 and 6 atoms in which the hetero atom is nitrogen, in the presence of an activating alcohol and an acid catalyst selected from the group consisting of mineral acids and electron acceptor salts wherein the concentration of the activating alcohol is at least 0.05 liter per mol of diethyl oxalimidate and the concentration of the acid catalyst is at least about 0.0001 mol per mol of diethyl oxalimidate, at a temperature from about 15° C. to about the reflux temperature of the mixture.

7. A process in accordance with claim 6 wherein the activating alcohol is a member selected from the group consisting of (1) lower aliphatic alcohols and (2) lower monoalkyl glycol ethers.

8. A process in accordance with claim 6 wherein the primary amine is phenylamine and the di-lower alkyl oxalimidate is diethyl oxalimidate.

9. A process in accordance with claim 6 wherein the primary amine is phenylmethylamine and the di-lower alkyl oxalimidate is diethyl oxalimidate.

10. A process in accordance with claim 6 wherein the primary amine is dimethylphenylamine and the di-lower alkyl oxalimidate is diethyl oxalimidate.

11. A process for preparing N,N′-diphenyloxamidine of the formula:

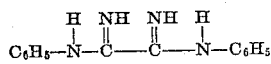

which comprises interacting about 1 mol of diethyl oxalimidate with about 2 mols of phenylamine in the presence of (A) an activating alcohol selected from the group consisting of lower aliphatic alcohols and lower monoalkyl glycol ethers and (B) an acid catalyst selected from the group consisting of mineral acids and electron acceptor salts, at a temperature from about 15° C. to about the reflux temperature of the mixture, wherein the concentration of the activating alcohol is at least about 0.05 liter per mol of diethyl oxalimidate and the concentration of the acid catalyst is at least about 0.0001 mol per mol of diethyl oxalimidate.

12. A process for preparing N,N′-di[phenylmethyl]-oxamidine which comprises interacting about 1 mol of diethyl oxalimidate with about 2 mols of phenylmethylamine in the presence of (A) an activating alcohol selected from the group consisting of lower aliphatic alcohols and lower monoalkyl glycol ethers and (B) an acid catalyst selected from the group consisting of mineral acids and electron acceptor salts, at a temperature from about 15° C. to about the reflux temperature of the mixture, wherein the concentration of the activating alcohol is at least about 0.05 liter per mol of diethyl oxalimidate and the concentration of the acid catalyst is at least about 0.0001 mol per mol of diethyl oxalimidate.

13. A process for preparing N,N′-dipyridyloxamidine which comprises interacting about 1 mol of diethyl oxalimidate with about 2 mols of pyridylamine in the presence of (A) an activating alcohol selected from the group consisting of lower aliphatic alcohols and lower monoalkyl glycol ethers and (B) an acid catalyst selected from the group consisting of mineral acids and electron acceptor salts, at a temperature from about 15° C. to about the reflux temperature of the mixture, wherein the concentration of the activating alcohol is at least about 0.05 liter per mol of diethyl oxalimidate and the concentration of the acid catalyst is at least about 0.0001 mol per mol of diethyl oxalimidate.

14. A process for preparing N,N′-di[dimethylphenyl]-oxamidine which comprises interacting about 1 mol of diethyl oxalimidate with about 2 mols of dimethylphenylamine in the presence of (A) an activating alcohol selected from the group consisting of lower aliphatic alcohols and lower monoalkyl glycol ethers and (B) an acid catalyst selected from the group consisting of mineral acids and electron acceptor salts, at a temperature from about 15° C. to about the reflux temperature of the mixture, wherein the concentration of the activating alcohol is at least about 0.05 liter per mol of diethyl oxalimidate and the concentration of the acid catalyst is at least about 0.0001 mol per mol of diethyl oxalimidate.

No references cited.

UNITED STATES PATENT OFFICE
CERTIFICATE OF CORRECTION

Patent No. 3,018,289 January 23, 1962

John D. Behun

It is hereby certified that error appears in the above numbered patent requiring correction and that the said Letters Patent should read as corrected below.

Column 1, line 21, for "yield" read -- yields --; column 2, line 31, for "diphenyl" read -- dipentyl --; column 3, line 45, after "temperature" insert -- from --; column 6, lines 19 and 20, for "reflpxed" read -- refluxed --.

Signed and sealed this 5th day of June 1962.

(SEAL)
Attest:

ERNEST W. SWIDER
Attesting Officer

DAVID L. LADD
Commissioner of Patents